United States Patent [19]

Richards et al.

[11] Patent Number: 4,896,688
[45] Date of Patent: Jan. 30, 1990

[54] BREAKAWAY HOSE COUPLING DEVICE

[75] Inventors: Alton Richards, Roane County; Leonard R. Nitzberg, Knox County, both of Tenn.

[73] Assignee: Richards Industries, Inc., Rockwood, Tenn.

[21] Appl. No.: 63,505

[22] Filed: Jun. 17, 1987

Related U.S. Application Data

[63] Continuation-in-part of Ser. No. 766,834, Aug. 16, 1985, Pat. No. 4,674,525.

[51] Int. Cl.$^4$ .......................... F16L 29/00; F16L 37/28
[52] U.S. Cl. ................................ 137/68.1; 137/614.04
[58] Field of Search ........................... 137/68.1, 614.04

[56] References Cited

U.S. PATENT DOCUMENTS

| 2,599,935 | 6/1952 | Pasker | 137/614.04 |
| 2,898,130 | 8/1959 | Hansen | 137/614.04 X |
| 2,978,225 | 4/1961 | Dallas | 137/614.04 X |
| 3,336,944 | 8/1967 | Anderson et al. | 137/614.04 |
| 3,435,848 | 4/1969 | Johnston | 137/614.04 |
| 3,460,801 | 8/1969 | Norton | 137/614.04 X |
| 3,520,331 | 7/1970 | Locke et al. | 137/614.04 |
| 3,586,047 | 6/1971 | Ehrenberg | 137/614.04 |
| 3,719,194 | 3/1973 | Anderson | 137/68.1 |
| 4,469,295 | 9/1984 | Schuster | 137/68.1 X |
| 4,499,545 | 5/1984 | Vernor | 137/68.1 |
| 4,509,554 | 4/1985 | Failla | 137/614.04 X |
| 4,628,996 | 12/1986 | Arnold | 137/68.1 X |
| 4,646,773 | 3/1987 | Klop | 137/68.1 |

FOREIGN PATENT DOCUMENTS 363833 2/1973 U.S.S.R. .......................... 137/614.04

Primary Examiner—Gerald A. Michalsky
Attorney, Agent, or Firm—Pitts and Brittian

[57] ABSTRACT

A breakaway hose coupling device (10') for releasably joining the hose ends of two fluid communicating hoses and for selectively disengaging and sealing such hose ends in response to a disengaging force of a preselected value is disclosed. The coupling device (10') comprises a coupling sleeve (12') defining an interior surface provided with an annular groove (80). The coupling device (10') further comprises first and second valve assemblies (20' and 22') each comprising a valve housing (24' and 25') having a forward end portion (26') for being received in the opposite ends of the coupling sleeve (12'), and a rearward end portion defining a threaded receptor (34') for engaging a hose end. Each valve housing is also provided with a passageway (30') therethrough communicating with the hose end, the passageway (30') defining a forwardly disposed valve seat (32'). Each of the valve assembly (20' and 22') further comprising a spring biased poppet valve (58') mounted within the passageway (30'). The valve housing (24',25') of one valve assembly (20',22') is provided with an annular recess (52') registering with the annular groove (80) as the valve housing is received in the sleeve (12'), the annular recess (52') being receptive of a coupling spring (82) which biases outwardly such that the outer radial portion (84) of the spring (82) is releasably received in the annular groove (80).

6 Claims, 7 Drawing Sheets

BREAKAWAY HOSE COUPLING DEVICE

This application is a Continuation-In-Part of U.S. patent application Ser. No. 766,834, filed Aug. 16, 1985, now U.S. Pat. No. 4,674,525.

TECHNICAL FIELD

The present invention relates to an improved breakaway hose coupling device for releasably joining the hose ends of two fluid communicating hoses. More specifically the coupling device is designed to disengage and seal such hose ends in response to a disengaging force of a preselected value being exerted on the coupling device.

BACKGROUND ART

Filling stations for dispensing gasoline and other fuels have long had a problem with vehicles pulling away from the fuel dispensing pump with the dispensing nozzle still inserted in the vehicle's tank, or with the nozzle or dispensing hose otherwise secured or hung on the vehicle. Such incidences usually result in damage to the dispensing pump and/or breakage of the dispensing hose. It will be appreciated that repairing the resulting damage to the dispensing pump and hose can be extremely costly. Further, the fuel spillage which can result from such damage can create a dangerous and possibly life threatening condition. Attempts have been made to overcome this problem by installing two hoses joined by a breakaway coupling device on the dispensing pump, with the coupling device designed to disengage and seal the hoses when pressure is exerted on the coupling as in the case where a vehicle pulls away from the pump with the nozzle or hose attached. Certain devices of this type are manufactured by Emco Wheaton, Inc. of Conneaut, Ohio, and Husky Corporation of Pacific, Mo. Further, certain devices are disclosed by U.S. Letters Pat. Nos. 1,551,697; 3,719,194; 3,741,521; 3,788,348; 3,797,510; 4,023,584; and 4,449,545. However, problems have been encountered with conventional breakaway hose coupling devices disengaging during normal operation in response to the fluid pressure surge within the hoses, or "water hammer" effect, created by the abrupt closing of the dispensing nozzle.

Therefore, it is an object of the present invention to provide an improved breakaway hose coupling device for releasably joining the hose ends of two fluid communicating hoses.

Another object of the present invention is to provide an improved breakaway hose coupling device for selectively disengaging and sealing the hose ends of two hoses in response to a disengaging force in excess of a preselected value being exerted on the coupling device.

Still another object of the present invention is to provide an improved breakaway hose coupling device which is less disruptive of fluid flow than conventional coupling devices.

Yet another object of the present invention is to provide a breakaway hose coupling device which is less susceptible to disengaging as a result of the fluid pressure surge created by the abrupt closing of the associated dispensing nozzle.

A further object of the present invention is to provide an improved breakaway hose coupling device which is easy to install and is less susceptible to shear pin damage upon installation.

Another object of the present invention is to provide an improved breakaway hose coupling device which is inexpensive to manufacture and maintain.

DISCLOSURE OF THE INVENTION

Other objects and advantages will be accomplished by the present invention which provides a breakaway hose coupling device for releasably joining the hose ends of two fluid communicating hoses and for disengaging and sealing such hose ends in response to a disengaging force of a preselected value. The coupling device comprises a coupling sleeve defining first and second oppositely disposed openings, and further defining at least one shear pin hole for receiving a shear pin having a preselected shear strength. The coupling device further comprises first and second valve assemblies each comprising a valve housing having a forward end portion for being received in one of the first and second openings of the coupling sleeve, and a rearward end portion defining a threaded receptor for engaging a hose end. Each valve housing is also provided with a passageway therethrough communicating with the hose end, the passageway defining a forwardly disposed valve seat. Further, the valve housing of one valve assembly is provided with an annular recess registering with the shear pin hole as the valve housing is received in the sleeve, whereby the shear pin is received in the shear pin hole and extends into a swivel ring member slidably mounted in the annular recess, thereby limiting the axial movement of said valve housing while allowing the valve housing to rotate within the coupling sleeve. Each of the first and second valve assemblies further comprising a spring biased poppet valve mounted within the passageway of the valve housing. Also, the poppet valves of each valve assembly define a forwardly disposed alignment pin receptor for releasably receiving an alignment pin.

In an alternate embodiment of the improved coupling device of the present invention, the coupling sleeve defines an annular groove which registers with the annular recess of the valve housing of one valve assembly, and an outwardly biasing spring is received in such annular recess such that the outward bias of the spring causes the outer radial portion of the spring to seat in the registering annular groove. The valve housing carrying the spring is thus held within the coupling sleeve until a disengaging force sufficient to overcome the outward bias of the spring is applied causing the spring to retreat into the annular recess of the valve housing allowing such valve housing to disengage from the coupling sleeve.

BRIEF DESCRIPTION OF THE DRAWINGS

The above-mentioned features of the invention will become more clearly understood from the following detailed description of the invention read together with the drawings in which.

BEST MODE FOR CARRYING OUT THE INVENTION

Figure 1:
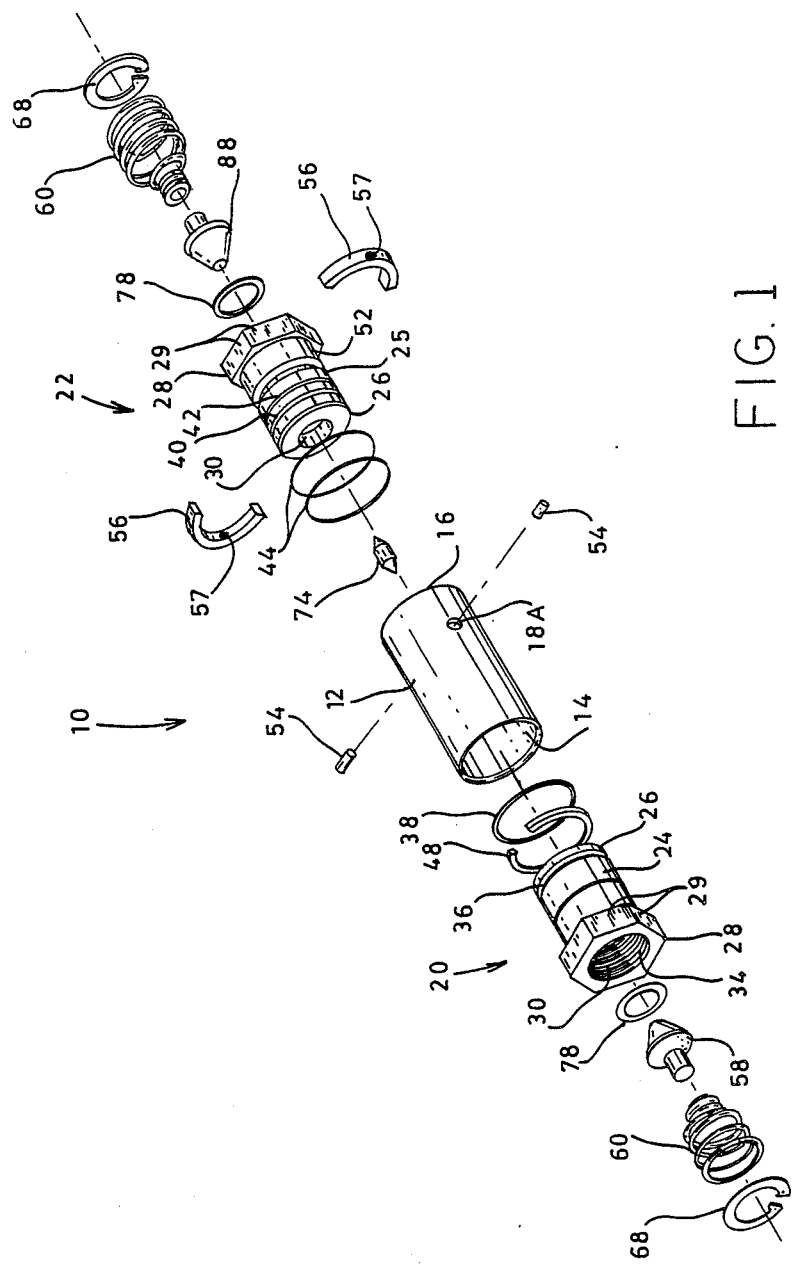
FIG. 1 is an exploded perspective view of the coupling device of the present invention.

A breakaway hose coupling device incorporating various features of the present invention is illustrated generally at 10 in the figures. The coupling device 10 is designed to accomplish the fluid impervious coupling of hose ends (not shown) of two fluid communicating hoses such as the hoses used in association with a fuel dispensing pump. The coupling device 10 is further designed to breakaway or disengage upon separation force in excess of a preselected value being applied against the coupling and to seal the disengaged hose ends. Whereas, the device 10 will be discussed at times herein in terms of joining fuel dispensing hoses, it will be appreciated that the device can be used to releasably join various types of hoses carrying various fluids.

The breakaway hose coupling device 10 includes coupling sleeve means which in the preferred embodiment comprises a cylindrical coupling sleeve 12 defining first and second oppositely disposed openings 14 and 16, respectively. The sleeve 12 further defines a pair of shear pin holes 18A and 18B, the function of which will be discussed in detail below. The coupling device 10 further comprises first and second valve assemblies 20 and 22, respectively, for being releasably received on the hose ends to be joined. Since the valve assemblies 20 and 22 comprise various common components and features, for the purpose of the discussion which follows such common components and features will be identified by common reference numbers.

The first and second valve assemblies 20 and 22 comprise first and second valve housings 24 and 25, respectively, each of the housings 24 and 25 having a forward end portion 26 for being closely received in the sleeve 12 and a rearward end portion 28 provided with a hexagonal cross-section so as to define a plurality of wrench flats 29. Further, each of the valve housings 24 and 25 defines a passageway 30 extending axially therethrough, with the passageway 30 defining a forwardly disposed valve seat 32 and a threaded receptor 34 proximate the rearward end portion 28 of the valve housing 24, 25. The threaded receptors 34 serve as means for releasably securing the valve housings 24 and 25 on a hose end. However, it will be appreciated that the receptors 34 are illustrative of only one preferred securing mans for securing the housing 24 and 25 to hose ends having threaded coupling ends. Other suitable securing means can be substituted for the receptors 34 where the configuration of the hose end coupling requires.

Figure 2:
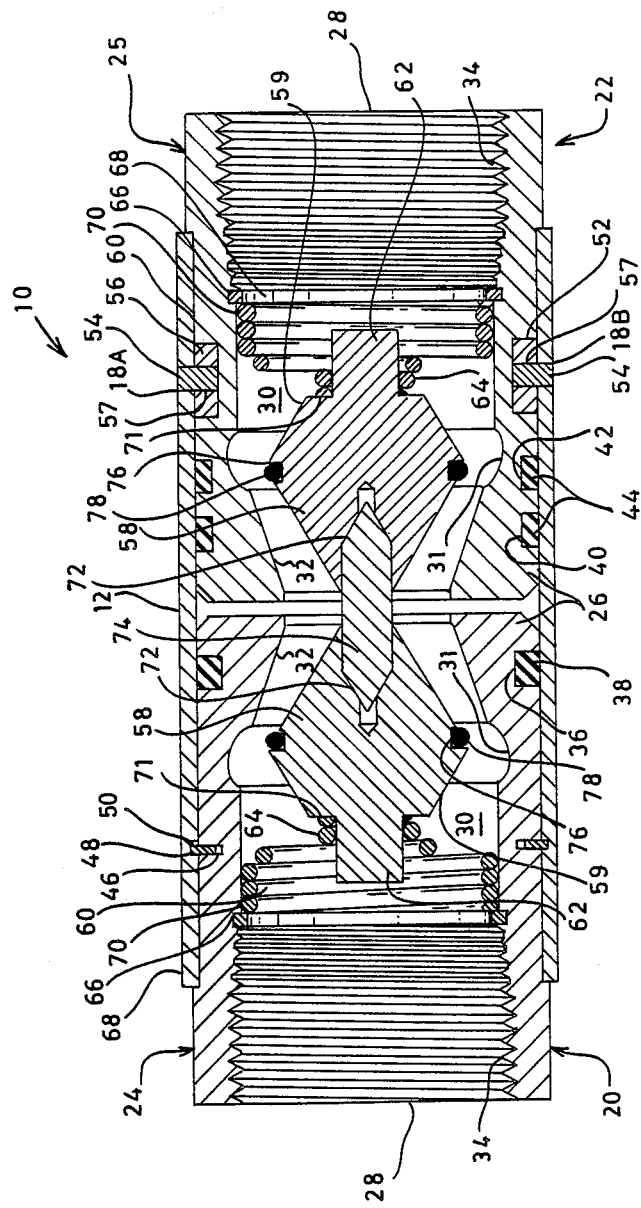
FIG. 2 is a side elevation view, in section, of the coupling device of the present invention.

As indicated above the forward end portions 26 of the valve housings 24 and 25 are closely received in the sleeve 12 as illustrated in FIG. 2. In order to ensure that a fluid impervious coupling is achieved each of the housings 24 and 25 is provided with suitable sealing means. More specifically, in the preferred embodiment the housing 24 is provided with an annular recess 36 for receiving an annular seal member 38. Similarly, the housing 25 is provided with first and second annular recesses 40 and 42, respectively, also receptive of annular seal members 44. Thus, it will be appreciated that the annular seal members 38 and 44 prohibit the fluid flowing through the passageways 30 from escaping between the valve housings 24 and 25 and the sleeve 12.

Figure 7:
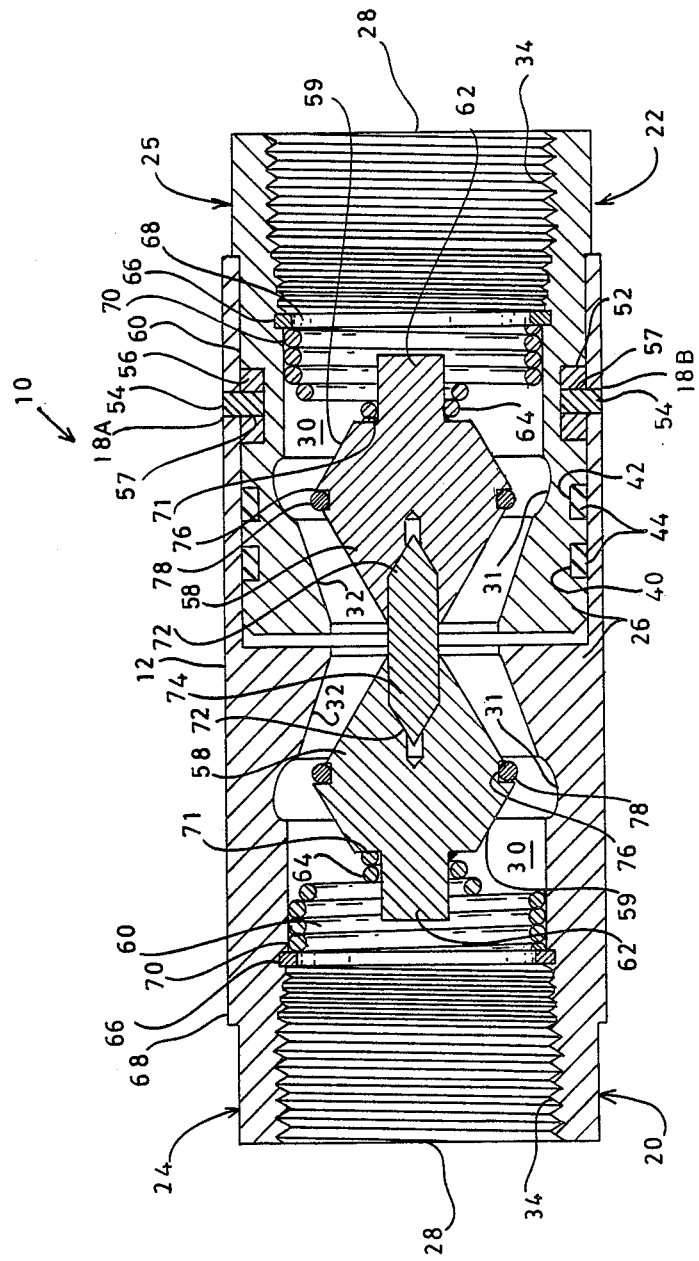
FIG. 7 illustrates a side elevation view, in section, of an alternate embodiment of the coupling device of the present invention.

In order to secure the forward end portions 26 of the valve housings 24 and 25 in the sleeve 12 each of the housings 24 and 25 is provided with suitable securing means. In this regard, in the preferred embodiment housing 24 is provided with an annular recess 46 releasably receptive of a retaining ring 48. A further annular recess 50, registering with the recess 46, is provided in the interior wall of the sleeve 12. Accordingly, when the housing 24 is inserted in the sleeve 12 with the retaining ring 48 in the recess 46 the retaining ring 48 lodges in the further recess 50 thereby restricting the rearward axial movement of the housing 24. It should be noted that if desired, the sleeve 12 can be integral with the housing 24 as illustrated in FIG. 7 or permanently secured to the housing 24 such that the housing 24 and the sleeve 12 integrally define a socket for receiving the forward end portion 26 of the housing 25.

With respect to the securing means for securing the housing 25, in the preferred embodiment the housing 25 is provided with an annular recess 52 which registers with the shear pin holes 18A and B and is rotatably receptive of a pair of semicircular swivel ring members 56. Each of the swivel ring members 56 is provided with a hole 57 receptive of a shear pin 54. Thus, as best illustrated in FIG. 2, with the swivel ring members 56 positioned in the annular recess 52 the shear pins 54 are received in the holes 18A and B of the sleeve 12 and in the holes 57 of the swivel ring members 56. It will be appreciated by those skilled in the art that with the shear pins 54 thusly positioned axial movement of the housing 25 within the sleeve 12 is restricted, but the housing 25 remains free to rotate within the sleeve 12. This ability of the housing 25 to rotate within the sleeve 12, or, differently stated, the ability of the sleeve 12 to rotate about the housing 25, helps prevent the shear pins 54 from being damaged by inadvertent twisting of the coupling device 10, particularly while the housing 25 is being installed on the associated hose end. In this regard, the tightening torque necessary for threadably securing the housing 25 on a hose end will normally exceed the shear strength of the shear pins 54, such that in the absence of such rotational ability the shear pins 54 could inadvertently be sheared as tightening torque is applied to the housing 25. However, whereas this rotation is desirable, it will be appreciated that excessive rotation of the housing 25 can result in chaffing and freezing of the swivel ring members 56 within the recess 52. Therefore, the housing 25 is provided with two seal members 44 which may be compressed so as to generate rotation restricting friction through contact with the sleeve 12. Thus, it will be understood that the seal members 44 serve not only to seal the device 10, but serve as braking means to prohibit excessive rotation of the housing 25 within the sleeve 12.

It will be understood by those skilled in the art that the shear pins 54 are designed to break or shear off when the total axial force to disengage reaches a preselected value, thus, allowing the housing 25 to slide from the sleeve 12 and the hoses to separate. Of course, shear pins 54 of various shear strengths can be used as desired. For example, where the coupling device 10 is used to join fuel hoses used in association with a conventional fuel dispensing pump it is desirable to have the coupling device disengage when axial disengaging force exceeds approximately 150 pounds, but for other applications it may be desirable to have the coupling device 10 disengage at different disengaging force levels. It should also be noted that whereas in the preferred illustrated embodiment the means for securing the housing 24 in the sleeve 12 differs from the means provided for securing the housing 25 in the sleeve 12, another housing 25 with its associated securing means can be substituted for the housing 24 and the sleeve 12 modified to incorporate a further pair of shear pin holes 18A and B if desired. It will be understood, however, that only one of the valve housings needs to be capable of disengaging from the sleeve 12 in response to axial force of a preselected value for the device 10 to function.

With respect to the material from which the shear pins 54 are fabricated, it will be recognized that a column of fluid moving through a hose has inertia that is proportional to its weight and velocity. When the flow is stopped suddenly, as when the dispensing nozzle of the hose is closed in order to terminate dispensing, this momentum is converted into a transient high-pressure surge (sometimes termed a "water hammer" effect) within the hose. This transient surge results in disengaging force being applied to the breakaway hose coupling. Whereas, the rated shear strength of a conventional metal shear pin may exceed the increased pressure of the transient surge, repetitive surges which occur through normal use quickly weaken conventional metal shear pins reducing their shear strength such that eventually the coupling disengages in response to such a transient surge. Accordingly, the shear pins 54 are preferably fabricated of an aromatic polymide (arimid) such as Kevlar, produced by the DuPont Company, dispersed in nylon or another suitable plastic matrix, e.g., 20% randomly dispersed Kevlar in nylon 66 and teflon (fluorocarbon). It has been found that Kevlar reinforced shear pins are more durable than conventional metal pins and maintain a predictable shear strength through extended use and repetitive high-pressure surges.

As previously discussed, the coupling device 10 not only allows the hose ends which have been joined to disengage in response to axial disengaging force, but also automatically seals the hose ends such that the fluid carried by the two hoses is not allowed to escape. In order to accomplish the sealing of the hose ends a poppet valve 58 is axially mounted within the passageway 30 of each of the valve housings 24 and 25. Also provided are the spring members 60 which serve both as means for mounting the poppet valves 58 and as biasing means to bias the valves 58 toward the valve seats 32. More specifically, the poppet valves 58 are provided with rearwardly disposed mounting stems 62 which are closely received in the openings defined by the forward end portions 64 of the spring members 60. Further, the housings 24 and 25 are each provided with the annular recesses 66 which releasably receive the spring retaining rings 68. The rearward end portions 70 of the spring members 60 engage the retaining rings 68 such that the spring members 60 act against the stationary retaining rings 68 and biasing surfaces 71 of the valves 58 resulting in the forward biasing of the valves 58. Of course, it will be appreciated by those skilled in the art that the retaining rings 68 could be integrally formed with the housings 24 and 25. However, it will be noted that the removable retaining rings 68 allow the spring members 60 to be removed and replaced when worn or defective, and therefore represent the preferred embodiment of the invention.

As indicated above, the spring members 60 serve not only to bias the valves 58 toward the valve seats 32, but also as the mounting means for the valves 58. Because the spring members serve as mounting means, the configuration of the springs is of primary significance. Referring now to FIG. 2, it will be noted that the rearward end portion 70 of the spring member 60 defines a cylindrical helix configuration while the forward end portion 64 of the spring 60 defines a conical helix configuration of smaller diameter. It will be appreciated by those skilled in the art that the conical configuration of the forward end portion 64 results in the forward end portion 64 exhibiting a greater resistance to compression than the cylindrically configured rearward end portion 70. Thus, whereas the rearward end portion 70 serves to produce sufficient biasing force to seat the valve 58, it is the forward end portion 64 which provides the rigidity and increased compression rate necessary to maintain the proper axial positioning of the valves 58. In this regard, when the valves 58 are in the open position illustrated in FIG. 2, the rearward end portion 70, having the lesser compression rate, is essentially fully compressed. Therefore, the biasing force on the valves 58 is generated by the more tightly wrapped, higher compression, forward end portion 64. Resultantly, the valves 58, when in the open position are more rigidly held in position than would be the case with a conventional cylindrical spring, and the spring members 60 are able to maintain the desired positioning of the valves 58 even against the flow of fluid through the passageway 30.

It will be appreciated that using the spring members 60 as the means for mounting the valves 58 is much less disruptive of the flow of fluid through the passageway 30 than other conventional valve mounting means. It obviates the use of flow disruptive valve mounting structures commonly used in coupling devices, allowing the coupling device 10 to operate more efficiently.

As best illustrated in FIG. 2, each of the poppet valves 58 defines a forwardly disposed alignment pin receptor 72 for receiving an end portion of the alignment pin 74. In this regard, when the housings 24 and 25 are in position within the sleeve 12 the opposite end portions of the alignment pin 74 are slidably received in the receptors 72, thereby further ensuring the axial alignment of the valves 58 and maintaining the poppet valves 58 at a preselected axial distance from the associated valve seat 32 notwithstanding the forward biasing of the spring members 60. Thus, by maintaining the desired axial position of the valves 58 the alignment pin 74 ensures a uniform undisrupted flow of fluid through the coupling device 10 and ensures that when the coupling device disengages the poppet valves 58 will be in alignment to be properly seated in the valve seats 32.

It should be noted at this point that both the valves 58 and the passageway 30 of the device 10 have been designed to facilitate the unrestricted flow of fluid through the coupling device 10. In this regard the valves 58 define rearward portions 59 which are rearwardly tapered to reduce drag as fluid passes around the valves 58. This rearward taper of the valves 58 helps deal with the transient surge produced when the associated dispensing nozzle is shut off. The taper allows the transient surge of fluid, in effect rebounding from the nozzle, to flow around the valves 58 with relatively little drag thereby reducing the axial force which would otherwise be exerted on the valve, and, thus, on the coupling. Further, the dispersal of the flow of the surge around the valves 58 results in a dispersal of the axial force of the surge, with much of the axial force of the surge (force that translates into disengaging force) being converted into a radially directed force absorbed over a greater surface area, thus, in effect, demodulating the pulse effect of the surge. Further, the passageways 30 define the expanded sections 31 which facilitate the unrestricted flow of fluid around the valves 58 as the valves 58 are in an open position. Of course, this also mitigates the effect of transient surges by allowing the axial force of the surging fluid to be directed through the coupling rather than being absorbed by the coupling.

Figure 3:
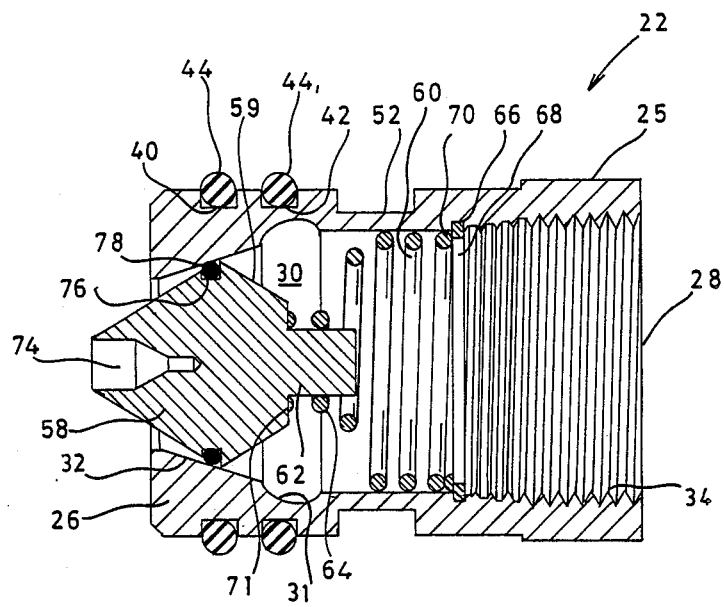
FIG. 3 is a side elevation view, in section, of a valve assembly of the coupling device of the present invention.

With respect to the operation of the poppet valves 58, when the housing 25 is pulled from the sleeve 12 the alignment pin 74 no longer serves to maintain the valves 58 in an open position and the spring members 60 bias the poppet valves 58 so as to engage the associated valve seat 32. In order to ensure a substantially fluid impervious seal between the valves 58 and the valve seats 32, each poppet valve 58 is provided with an annular groove 76 which releasably receives an annular seal member 78. As illustrated in FIG. 3, the seal 78 engages the valve seat 32 and forms a substantially fluid impervious seal between the valve 58 and the valve seat 32. Accordingly, as soon as the housing 25 is withdrawn from the sleeve 12 the poppet valves 58 of both valve assemblies 20 and 22 seal off the associated hose end avoiding loss of fluid from the hoses.

In the preferred embodiment of the coupling device 10 the housings 24 and 25, the spring members 60, the valve members 58 and the alignment pin 74 are all fabricated of a strong durable electrically conductive metal to ensure the electrical continuity of the coupling device 10. This electrical continuity is important, and in fact a statutory requirement, where the fluid directed through the coupling device is a flammable liquid and dangerous buildups of static electricity are to be avoided.

Figure 4:
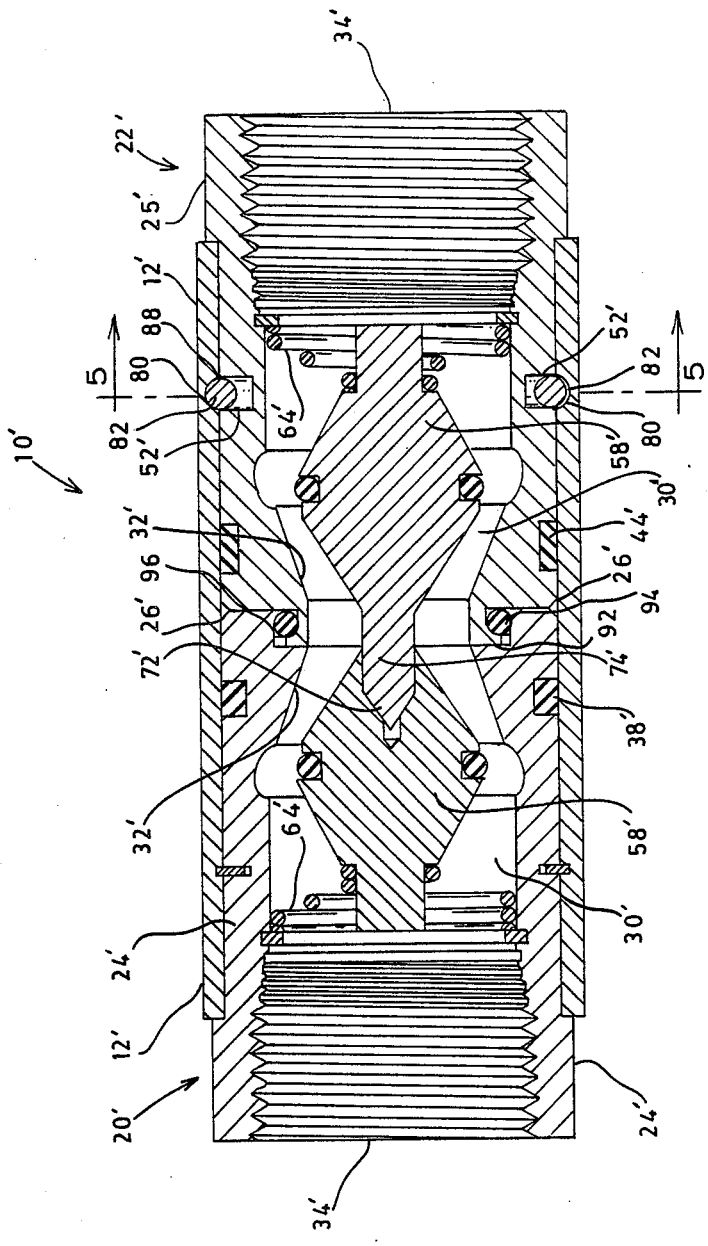
FIG. 4 is a side elevation view, in section, of an alternate embodiment of the coupling device of the present invention.
Figure 5:
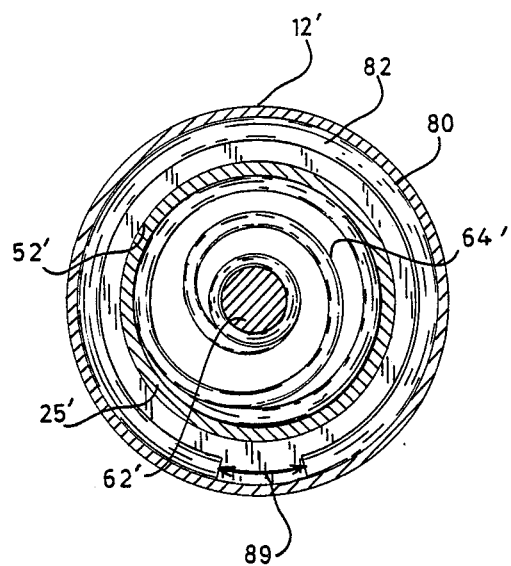
FIG. 5 is an end view, in section at 5—5 of FIG. 4, of an alternate embodiment of the coupling device of the present invention.
Figure 6A:
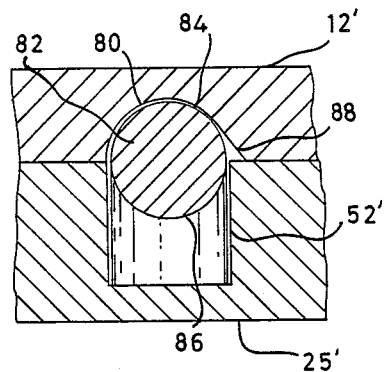
FIGS. 6A-C are partial side elevation views, in section, of an alternate embodiment of the coupling device of the present invention.

In FIGS. 4 and 5, an alternate embodiment of the breakaway hose coupling device of the present invention is illustrated at 10'. For convenience, features of the device 10' which are common to the device 10 described above are referenced in the figures with common prime numerals. The device 10' is provided with alternate means for releasably securing the second valve housing 25' in the sleeve 12' such that the housing 25' disengages from the sleeve 12' upon separation force in excess of a preselected value being applied. In this regard, the interior wall of the sleeve 12' is provided with an annular groove 80 which registers with the annular recess 52' of the housing 25' when the housing 25' is in a coupled position within the sleeve 12'. A coupling spring 82 is received in the recess 52', the spring 82 being fabricated of a resilient material such as steel, or other metal, such that as the spring 82 is received about the housing 25' the spring 82 biases outwardly, or radially. Accordingly, when the housing 25' is in a coupled position within the sleeve 12' the outer radial portion 84 of the spring 82 seats in the groove 80 while the inner radial portion 86 of the spring 82 remains in the recess 52 as is best illustrated in FIG. 6A. It will be appreciated that with the portion 84 of the spring 82 seated in the groove 86 and the portion 86 of the spring 82 seated in the recess 52', the spring 82 serves to restrict axial movement of the housing 25' within the sleeve 12' thereby holding the housing 25' in a coupled position.

Figure 6B:
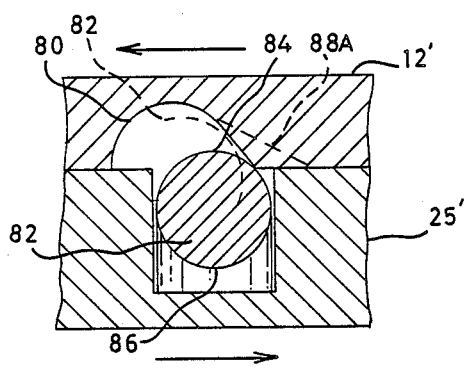
Figure 6C:
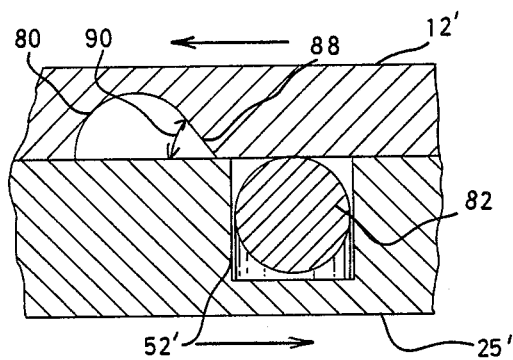

In order to facilitate the disengaging of the housing 25' from the sleeve 12' upon the application of a preselected disengaging force the annular groove 80 is provided with a sloped outer sidewall defining a cam surface 88. As best illustrated in FIG. 6B, as axial disengaging force is exerted on the coupling device 10', the cam surface 88 acts against the outer radial portion 84 of the spring 82 applying inward pressure on the spring 82 tending to decrease the diameter of the spring 82 and forcing it into the recess 52'. It will be appreciated that when the disengaging force is such that the inward radial pressure of the cam surface 88 on the spring 82 is sufficient to overcome the outward radial bias of the spring 82, the spring 82 is forced into the recess 52' and the housing 25' is allowed to slide from the sleeve 12' as illustrated in FIG. 6C. It will be noted that in the preferred embodiment a gap (referenced at 89 in the FIG. 5) is defined between the opposite end portions of the spring 82 to accommodate the decrease in diameter of the spring 82 as it is forced into the recess 52'.

It will be appreciated by those skilled in the art that the disengaging force necessary for uncoupling the device 10' can be preselected by utilizing a spring 82 which produces the appropriate radial bias pressure. Further, it will be understood that in order for the housing 25' to disengage from the sleeve 12' the disengaging force exerted on the coupling device 10' must be sufficient to overcome the cummulative radial bias pressure produced along the circumference of the spring 82. Thus, the disengaging force necessary to withdraw the housing 25' from the sleeve 12' can be substantial even where a light weight spring 82 is utilized. A formula which has been found to be useful in predicting the mass bias result of the spring ($M_L$) is $M_L = 2 F(360-A/360)$, with "F" being the force applied against the spring and "A" being the degrees represented by the gap 89.

It will also be noted that the disengaging force necessary for uncoupling the device 10' will vary depending on the angle 90 defined by the cam surface 88. In this regard, the angle 90 of the cam surface 88 determines how much of the disengaging force is directed inwardly against the radial bias of the spring 82. Thus, by decreasing the angle 90 (for example, so as to provide the cam surface 88A of FIG. 6B) a greater portion of the total disengaging force is directed inwardly against the bias of the spring 82, with the result being that less total disengaging force is necessary to effect the uncoupling of the device 10'. Of course, the opposite is also true. As the angle 90 is increased the total disengaging force required for uncoupling increases.

The coupling device 10' also comprises means for releasably joining forward end portions 26' of the first and second valve housing 24' and 25'. Such means include a protruding annular lip 92 provided on the forward end portion 26' of the housing 25' for carrying an annular seal 94. An annular recess 96 is provided in the forward end portion 26' of the housing 24' for closely receiving the lip portion 92 and seal 94 of the housing 25' such that the seal 94 engages the sidewalls of the recess 96, thereby sealably joining the housings 24' and 25'. Of course, it will be understood that the lip portion 92 can just as easily be provided on the housing 24', and the housing 25' provided with an annular recess 96, if desired. It will also be noted that in the alternate embodiment of the device 10', the alignment pin 74' is integrally formed with one of the poppet valves 58' such that when the device 10' disengages, the pin 74' is not lost. Of course, it will be understood that both of the poppet valves 58' can be provided with alignment pin receptors 72' (as illustrated by the broken lines at 72' in FIG. 4) and an independent pin 74' can be used if desired, as described above with respect to the embodiment of FIGS. 1 through 3.

It should be noted that the alternative coupling device 10' is designed to reduce the effect of repetitive transient surges. By utilizing the smaller diameter annular seal 94 to seal the passageways 30 rather than relying on seals between the sleeve 12' and the housings 24' and 25', the surface area of the housing 25' which is effected by the force of a transient surge is reduced, thereby reducing the disengaging force absorbed by the housing 25' as a result of a surge. In this regard, where seals between the housing 25' and the sleeve 12' are utilized the increased pressure of the surge acts upon the entire forward surface area of the housing 25', but, by reducing the diameter of the seal, as with the use of the seal 94, the pressure effected area is reduced. Thus, in the case of the device 10' the pressure effected area, or area of the housing 25' which encounters axial disengaging force from the surge, is reduced to the forward surface of the annular lip 92, making the device 10' less susceptible to disengaging in response to a transient surge.

It will also be understood that, given its resilience, the spring 82 can absorb the shock of repetitive transient surges without damage to the spring. Further, in response to a surge, the housing 25' can move rearwardly a selected distance within the sleeve 12' without disengaging, as, for example, moving from the normally engaged position illustrated in FIG. 6A to the position illustrated in FIG. 6B. As a result, the forward end portions 26' of the housings 24' and 25' move apart so as to define a space or accumulation chamber between the two housings which helps accommodate and reduce the increase in fluid pressure of the transient surge. Of course, as long as the surge is not so great as to totally overcome the bias of the spring 82, the spring 82 will force the housings 24' and 25' back together when the increase in pressure caused by the surge has dissipated.

In light of the above discussion, it will be appreciated that the coupling device 10 provides an improved breakaway coupling for joining two hose ends. The device 10 solves the problem of damage to a fuel dispensing pump as a result of excessive force being exerted on the associated dispensing hose. When used with a fuel dispensing pump, the device 10 is mounted between a pair of hoses, one of which is secured to the dispensing pump. When force is exerted on the hoses which is sufficient to shear the shear pins 54, or sufficient to overcome the bias of the spring 82, the coupling device 10 disengages to prevent damage to the pump, and the valve assemblies 20 and 22 seal the hose ends such that dangerously flammable, and valuable, fuel does not spill from the hoses.

While a preferred embodiment has been shown and described, it will be understood that there is no intent to limit the invention to such disclosure, but rather it is intended to cover all modifications and alternate constructions falling within the spirit and scope of the invention as defined in the appended claims.

We claim:

1. An improved breakaway hose coupling device for releasably joining the hose ends of two fluid communicating hoses and for selectively disengaging such hose ends in response to a disengaging force of a preselected value being exerted on such hoses and/or said coupling device, while being resistant to disengaging in response to transient fluid pressure surges in the flow of fluid through said coupling, said coupling device comprising:

a coupling sleeve, said coupling sleeve defining first and second oppositely disposed openings, and further defining at least one shear pin hole;

first and second valve assemblies for being releasably secured on such hose ends, each said valve assembly comprising a valve housing having a forward end portion for being received in said first and second openings of said sleeve member and a rearward end portion provided with means for releasably engaging one such hose end, said valve housing being provided with a passageway therethrough communicating with such hose end, said passageway defining a forwardly disposed valve seat, each said first and second valve assembly further comprising a poppet valve mounted within said passageway of said valve housing, said poppet valve being provided with means for biasing said poppet valve toward said valve seat, one said valve housing being provided with a first exterior annular recess registering with said shear pin hole as said valve housing is received in said coupling sleeve; and a shear pin closely received in said shear pin hole and said first annular recess thereby limiting axial movement of said valve housing in said sleeve in the absence of such disengaging force in excess of said preselected value without limiting rotation of said valve assembly relative to said sleeve, said shear pin being fabricated with Kevlar arimid fibers dispersed in a plastic matrix, whereby said shear pin is predictably frangible, yet is not susceptible to being weakened by said transient surges.

2. An improved breakaway hose coupling device for releasably joining the hose ends of two fluid communicating hoses and for selectively disengaging such hose ends in response to disengaging force of a preselected value being exerted on such hose ends and/or said coupling device while being resistant to disengaging in response to transient fluid pressure surges in the flow of fluid through said coupling, said coupling device comprising:

a first valve assembly for being releasably secured on one said hose end, said first valve assembly comprising a first valve housing having a rearward end portion for releasably engaging one said hose end and a forward end portion carrying a coupling sleeve, said coupling sleeve defining a first opening and further defining at least one shear pin hole, said first valve housing being provided with a passageway therethrough communicating with said hose end, and valve means mounted within said passageway for selectively closing said passageway to the flow of said fluid;

a second valve assembly for being releasably secured on said hose end, said second valve assembly comprising a second valve housing having a rearward end portion for releasably engaging one said hose end and a forward end portion for being releasably received in said first opening of said coupling sleeve of said first valve housing, said second valve housing being provided with a further passageway therethrough communicating with said hose end, and valve means mounted within said further passageway for selectively closing said further passageway to the flow of said fluid, said second valve housing being provided with a first exterior recess registering with said shear pin hole as said second valve housing is received in said coupling sleeve; and a shear pin closely received in said shear pin hole and said first recess thereby limiting axial movement of said disengaging force in excess of said preselected value, said shear pin being reinforced with Kevlar arimid fibers, whereby said shear pin is predictably frangible, yet is not susceptible to being weakened by said transient surges.

3. The improved coupling device of claim 2 wherein said shear pin is fabricated of Kevlar arimid fibers randomly dispersed in nylon.

4. An improved breakaway hose coupling device adapted for releasably connecting the end fittings of two fluid communicating hoses and for decoupling the end fittings in response to a predetermined separation force exerted on the hoses while being resistant to decoupling in response to transient fluid pressure surges in the flow of fluid through said coupling, said coupling device comprising first and second valve housings, means releasably connecting said housings and provided for axial separation of said housings in response to said separation force, each of said valve housings defining an internal passageway and having a forward end portion and a rearward end portion, said rearward end portion of each said housing having thread means for connecting one of the end fittings, said forward end portion of each said housing having an internal valve seat, a corresponding poppet valve member disposed within said passageway of each said valve housing, a biasing means within each of said valve housing for biasing said valve member toward the corresponding said valve seat, said means connecting said housing comprising a coupling sleeve having a first end portion secured to said first valve housing and a second end portion defining an opening, and further defining at least one shear pin hole, said second valve housing being provided with a shear pin recess registering with said shear pin hole as said second valve housing is received and selectively positioned in said coupling sleeve, and wherein said device includes a shear pin closely received in said shear pin hole and said shear pin recess thereby limiting axial movement of said valve housing with respect to said sleeve in the absence of such disengaging force in excess of said predetermined separation force, said shear pin being fabricated with Kevlar arimid fibers dispersed in a plastic matrix, whereby said shear pin is predictably frangible, yet is not susceptible to being weakened by said transient surges.

5. The improved breakaway hose coupling device of claim 4 wherein said plastic matrix comprises nylon.

6. The improved breakaway hose coupling device of claim 4 wherein said coupling sleeve is integrally formed with said first valve housing.

* * * * *